US010235631B2

(12) United States Patent
Singh et al.

(10) Patent No.: US 10,235,631 B2
(45) Date of Patent: Mar. 19, 2019

(54) METHODS AND APPARATUS TO PREDICT MACHINE FAILURES

(71) Applicant: Deere & Company, Moline, IL (US)

(72) Inventors: Mahesh Pratap Singh, Lucknow (IN); Gauri Narayan Pophale, Pune (IN); Mayuri Kudale, Pune (IN); Hridoy Das, Kamrup (IN)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 15/253,748

(22) Filed: Aug. 31, 2016

(65) Prior Publication Data

US 2018/0005132 A1 Jan. 4, 2018

(30) Foreign Application Priority Data

Jul. 1, 2016 (IN) .............................. 201621022703

(51) Int. Cl.
*G06N 7/00* (2006.01)
*G05B 23/02* (2006.01)

(52) U.S. Cl.
CPC ......... *G06N 7/005* (2013.01); *G05B 23/0283* (2013.01)

(58) Field of Classification Search
CPC ............. G06K 2209/23; G06K 9/4642; G06K 9/6269; G06N 7/005
See application file for complete search history.

(56) References Cited

U.S. PATENT DOCUMENTS 7,079,982 B2 7/2006 Ogura et al.
8,412,406 B2 4/2013 Johnson et al.
(Continued)

OTHER PUBLICATIONS

Rosenvinge, "Lifetime Analysis of Automotive Batteries using Random Forests and Cox Regression", Master's Thesis in Computer Science, KTH Computer Science and Communication, Sweden, Feb. 2013, accessed on Jun. 28, 2016, [http://users.isy.liu.se/fs/frisk/tmp/PhDPos/Rosenvinge_2013.pdf], 75 pages.

(Continued)

*Primary Examiner* — Elias Desta
(74) *Attorney, Agent, or Firm* — Hanley, Flight & Zimmerman, LLC

(57) ABSTRACT

Methods and apparatus of modeling work vehicle data and predicting machine failures based on the same are disclosed. An example method includes accessing a first alert sequence from a work vehicle, the first alert sequence is associated with one or more of observed diagnostic code, observed vehicle sensor data, or observed vehicle status data; comparing the first alert sequence to a model including an association between reference alert sequences, reference machine failures, and probable parts used to repair the respective reference machine failures; identifying a substantial similarity between the first alert sequence and a first reference alert sequence of the reference alert sequences; and based on the model and the first reference alert sequence, identifying first probable parts of the probable parts used to repair a first reference machine failure of the reference machine failures, where the first reference machine failure is associated with the first reference alert sequence.

20 Claims, 8 Drawing Sheets

(56) References Cited

U.S. PATENT DOCUMENTS

| | | | | |
|---|---|---|---|---|
| 8,478,514 | B2* | 7/2013 | Kargupta | G06Q 10/08 |
| | | | | 180/167 |
| 9,780,967 | B2* | 10/2017 | Sargent | H04L 12/66 |
| 2002/0107624 | A1 | 8/2002 | Rutz | |
| 2007/0156311 | A1* | 7/2007 | Elcock | G07C 5/008 |
| | | | | 701/31.4 |
| 2008/0084332 | A1 | 4/2008 | Ritter et al. | |
| 2008/0186870 | A1 | 8/2008 | Butts et al. | |
| 2016/0035150 | A1* | 2/2016 | Barfield, Jr. | G07C 5/008 |
| | | | | 701/29.3 |

OTHER PUBLICATIONS

Kay et al., "Predicting Equipment Failures Using Weibul Analysis and SAS Software", accessed on Jun. 28, 2016, [http://www.sascommunity.org/sugi/SUGI88/Sugi-13-43%20Kay%20Price.pdf], 6 pages.

Fan et al., "Reliability Analysis and Failure Prediction of Construction Equipment with Time Series Models", Journal of Advanced Management Science vol. 3, No. 3, Sep. 2015, accessed on Jun. 28, 2016, [http://www.joams.com/uploadfile/2014/0819/20140819035019605.pdf], 8 pages.

Abbas et al., "Development of Predictive Markov-chain Condition—Based Tractor Failure Analysis Algorithm", Research Journal of Agriculture and Biological Sciences, 7(1): 52-67, 2011, accessed on Jun. 28, 2016, [http://sustech.edu/staff_publications/20110527125656126.pdf], 16 pages.

Zhang et al., "An Integrated Approach to Bearing Fault Diagnostics and Prognostics", Presented in American Control conference Jun. 8-10, 2005. Portland, OR, USA, accessed on Jun. 28, 2016, [https://www.researchgate.net/profile/Chiman_Kwan/publication/224617313_An_integrated_approach_to_bearing_fault_diagnostics_and_prognostics/links/0fcfd50b291c7d7b37000000.pdf], 6 pages.

Bjerkeseth, "Using Hidden Markov Models for fault diagnostics and prognostics in Condition Based Maintenance systems", Master's Thesis, Faculty of Engineering and Science, University of Agder, Norway, May 2010, accessed on Jun. 28, 2016, [https://brage.bibsys.no/xmlui/bitstream/handle/11250/137502/Bjerkeseth.pdf?sequence=1], 58 pages.

Salfner, "Predicting Failures with Hidden Markov Models", accessed on Jun. 28, 2016, [http://www.citemaster.net/get/2b8103da-f323-11e4-95fd-00163e009cc7/salfner05predicting.pdf], 6 pages.

Said et al., "Telematics Data-Driven Prognostics System for Construction Heavy Equipment Health Monitoring and Assessment", 5th International/11th Construction Specialty Conference, Vancouver, British Columbia, Jun. 8 to Jun. 10, 2015, accessed on Jun. 28, 2016, [https://open.library.ubc.ca/cIRcle/collections/52660/items/1.0076365], 10 pages.

Prytz, "Machine learning methods for vehicle predictive maintenance using off-board and on-board data", Licentiate Thesis, Halmand University Dissertations No. 9, Halmstad University, 2014, accessed on Jun. 29, 2016, [http://hh.diva-portal.org/smash/get/diva2:789498/FULLTEXT01.pdf], 96 pages.

Last, "Vehicle Failure Prediction Using Warranty and Telematics Data", Ben-Gurion University of the Negev, Department of Information Systems Engineering, Israel, accessed on Jun. 28, 2016, [http://www.kd2u.org/NGDM11/Papers2011/mark.pdf], 5 pages.

Li et al., "Failure event prediction using the Cox proportional hazard model driven by frequent failure signatures", IIE Transactions (2007) 39, 303-315, accessed on Jun. 28, 2016, [http://homepages.cae.wisc.edu/~zhous/papers/n7v0110506474825.pdf], 13 pages.

\* cited by examiner

| SUPPORT | SEQUENCE | SEQUENCE LENGTH |
|---|---|---|
| 24 | (I_111_17)-(I_111_17)-(I_1569_31)-(I_111_17) | 4 |
| 24 | (I_111_17)-(I_111_17)-(I_1569_31)-(I_111_17,Y_111_17) | 5 |
| 24 | (I_111_17)-(I_111_17)-(I_1569_31)-(Y_111_17) | 4 |
| 24 | (I_111_17)-(I_111_17)-(I_1569_31)-(I_111_17) | 4 |
| 24 | (I_111_17)-(Y_111_17)-(I_1569_31)-(I_111_17,Y_111_17) | 5 |
| 24 | (I_111_17)-(Y_111_17)-(I_1569_31)-(I_111_17) | 4 |
| 24 | (I_111_17)-(Y_111_17)-(I_1569_31)-(Y_111_17) | 4 |
| 24 | (I_1569_31,Y_3719_16) | 2 |
| 24 | (I_1569_31,Y_94_18)-(I_1569_31)-(Y_94_18) | 5 |
| 24 | (I_1569_31,Y_94_18)-(I_1569_31)-(Y_94_18) | 5 |
| 24 | (I_1569_31,Y_94_18)-(I_1569_31)-(Y_94_17) | 5 |
| 24 | (I_1569_31,Y_94_18)-(Y_94_17)-(I_1569_31)-(Y_94_17) | 5 |
| 24 | (I_1569_31,Y_94_18)-(Y_94_17)-(I_1569_31) | 4 |
| 24 | (I_1569_31,Y_94_18)-(Y_94_17)-(I_1569_31)-(Y_94_17) | 5 |
| 24 | (I_1569_31)-(I_111_17)-(I_1569_31)-(I_1569_31) | 5 |
| 24 | (I_1569_31,Y_3719_10)-(I_1569_31) | 4 |
| 24 | (I_1569_31,Y_3719_16) | 3 |
| 24 | (I_1569_31)-(I_1569_31)-(I_1569_31)-(Y_94_18) | 5 |
| 24 | (I_1569_31)-(I_1569_31)-(Y_94_18)-(R_157_1) | 5 |
| 24 | (I_1569_31)-(I_1569_31)-(Y_1639_18)-(I_1569_31) | 5 |
| 24 | (I_1569_31)-(I_1569_31)-(Y_94_17)-(Y_94_18) | 5 |
| 24 | (I_1569_31)-(I_1569_31)-(Y_94_17)-(Y_94_18) | 5 |
| 24 | (I_1569_31)-(I_1569_31)-(Y_1639_16)-(Y_1639_16) | 5 |
| 24 | (I_1569_31)-(I_1569_31)-(Y_1639_18)-(Y_1639_18)-(I_1569_31) | 5 |
| 24 | (I_1569_31)-(I_1569_31)-(Y_94_17)-(Y_94_18) | 5 |
| 24 | (I_1569_31)-(I_1569_31,Y_94_18) | 4 |
| 24 | (I_1569_31)-(Y_94_17)-(Y_94_18)-(R_157_1) | 4 |
| 24 | (I_1569_31)-(I_189_31) | 2 |
| 24 | (I_1569_31)-(R_1180_0) | 2 |

FIG. 6

PARTS REQUIREMENT ACCORDING TO MACHINE FAILURE PROBABILITY

| MACHINE NAME | FAILURE PROBABILITY | PROBABLE PARTS |
|---|---|---|
| 1RW8360RADD076095 | 55.56% | RE538131,RE539960,RG38168,R533894 |
| 1RW8360RHDDSJDyiL | 35.71% | RE306975,RE330804 |
| 1RW8360RABD044289 | 30.43% | RE533894,RE538131,RE539960 |
| 1RW8360RKCD054686 | 29.41% | RS33894,RE53992 |
| 1RW8360RVBD042234 | 27.78% | RS33894,RE306975,RE542437,RE539229 |
| 1RW8360RPCD068067 | 25.93% | RE538131,RE541978,RE542437,RE542461 |
| 1RW8360RACD061479 | 25% | RE542437,RE551415,RE330804 |
| 1RX8370RTZD223456 | 23.81% | RE306975,RE542437,RE539229 |

FIG. 7

METHODS AND APPARATUS TO PREDICT MACHINE FAILURES

This patent claims priority to Indian Patent Application No. 201621022703, filed on Jul. 1, 2016. IN 201621022703 is hereby incorporated herein by reference in its entirety.

FIELD OF THE DISCLOSURE

This disclosure relates generally to modeling data, and, more particularly, to methods and apparatus to predict machine failures.

BACKGROUND

Routine maintenance may be performed on a work vehicle based on a maintenance schedule. When such maintenance is performed, diagnostic data may be obtained from the work vehicle.

SUMMARY

An example method includes accessing a first alert sequence from a work vehicle, the first alert sequence is associated with one or more of observed diagnostic code, observed vehicle sensor data, or observed vehicle status data; comparing the first alert sequence to a model including an association between reference alert sequences, reference machine failures, and probable parts used to repair the respective reference machine failures; identifying a substantial similarity between the first alert sequence and a first reference alert sequence of the reference alert sequences; and based on the model and the first reference alert sequence, identifying first probable parts of the probable parts used to repair a first reference machine failure of the reference machine failures, where the first reference machine failure is associated with the first reference alert sequence.

BRIEF DESCRIPTION OF THE DRAWINGS

FIG. 6 illustrates an example table including data obtained in connection with the teachings of this disclosure.

FIG. 7 illustrates an example table including data obtained in connection with the teachings of this disclosure.

The figures are not to scale. Wherever possible, the same reference numbers will be used throughout the drawing(s) and accompanying written description to refer to the same or like parts.

DETAILED DESCRIPTION

Figure 1:
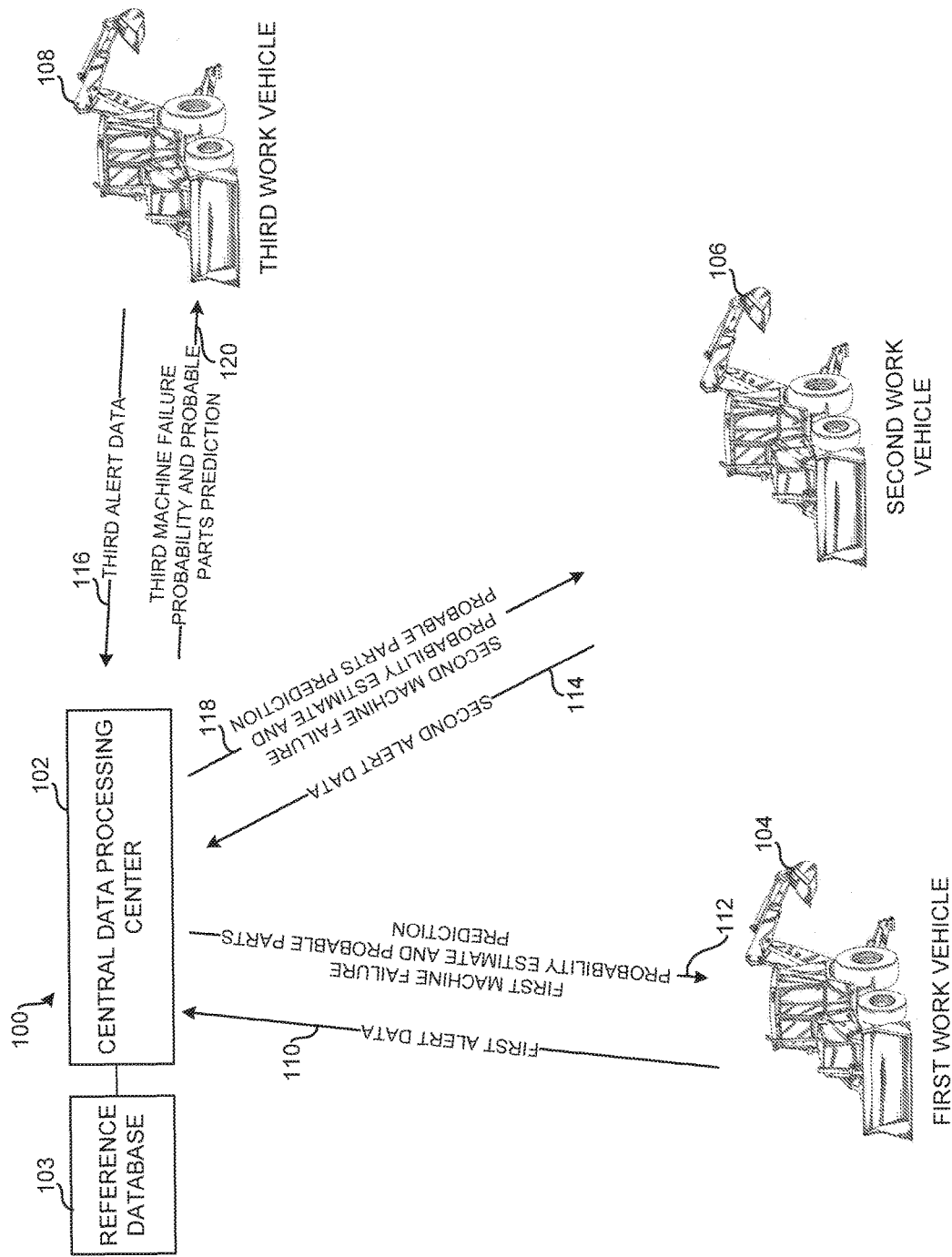
FIG. 1 illustrates an example system for monitoring work vehicles to predict and/or identify possible machine failures and identify parts used to repair such machine failures should one occur.

The methods and systems disclosed herein are well suited to evaluate one or more of the following to provide predictive maintenance or repair information: particular combinations or permutations of diagnostic codes, the duration, time or frequency of the diagnostic codes, data about other standard operating conditions of the vehicle (e.g., total vehicle operating hours, historic fuel consumption, vehicle age or manufacturing date, as-built documentation for parts in the vehicle from particular suppliers, maintenance/repair records or warranty records of similar vehicles with similar as-built components or certain serial number ranges indicating manufacturing facility/country/dates) to complete predictive maintenance and determine a part list for repair or maintenance of the vehicle.

The examples disclosed herein relate to monitoring work vehicles to predict and/or identify possible machine failures and identify parts used to repair such machine failures should one occur. To enable such predictions and/or identifications to occur, in some examples, data is obtained from work vehicles in real time and compared to data contained within a predictive model. Based on the comparison, substantial matches between, for example, an alert sequence within the data from one or more of the work vehicles and a reference alert sequence associated with a machine failure are identified. In some examples, the reference alert sequence associated with the machine failure is also associated with probable parts to repair the machine failure and/or technical documentation to make such repairs. In some examples, an alert sequence may include a combination and/or permutation of observed diagnostic code, observed vehicle sensor data and/or observed vehicle status data, which may include the frequency, duration or order of the data as observed at the vehicle or equipment. In some examples, the alert sequence data is characterized by a duration (e.g., alert length) of observation of the data and/or can be an indicator that is associated with correlation data (or causal data) for certain faults and/or certain repair parts.

In some examples, to generate the predictive model, alert data, warranty data and parts and associated maintenance data are obtained from the work vehicles (e.g., a large population of work vehicles historical data) and collated and/or processed to enable the association between machine failures, parts used to repair the machine failures and alert sequences leading to a machine failure. The machine failures may be identified from the warranty data, the parts used to repair the machine failures may be identified from the parts and associated maintenance data and the alert sequences leading to a machine failure may be identified from the alert data obtained from the work vehicles in real time. In some examples, identifying the alert sequences leading to machine failures includes segmenting the alert data into sequences by identifying two sequential operating-failure alerts (e.g., two temporarily adjacent operating-failure alerts). As used herein, the phrase "temporally adjacent" means that the alerts are within a threshold range of one another and/or that the alerts sequentially occur. In such examples, the alerts between the two operating-failure alerts are associated with a corresponding alert sequence (e.g., alert sequence between failures (ASBF)).

The rules and/or identified alert sequences included in the predictive model may be based on a tally of the number of work vehicles affected by such a machine failure, a conditional probability of the alert sequence leading to machine failure and/or a significance level of the rules and/or identified alert sequences. For example, alert sequences leading to a machine failure that affect a threshold number of work vehicles may be included in the model. In some examples, to determine the conditional probability of the alert sequence leading to machine failure, alert sequences ending in failure may be compared to the same length alert sequences not ending in failure. In some examples, to determine the probability of an alert sequence occurring, with or without failure, the alert sequences ending and not ending in failure are compared to other alert sequences having the same length. In some examples, the significance level of the conditional probability of each alert length sequence occurring may be determined and compared to respective thresholds to determine whether or not to include the alert sequence in the model.

FIG. 1 is an example system 100 for monitoring alert sequences from work vehicles and determining and/or predicting a probability of a machine failure occurring and probable parts used to repair the work vehicle should a machine failure occur. In this example, the system 100 includes an example central data processing center 102 coupled to a reference database 103 that stores reference alert sequences, reference machine failures and reference parts lists associated with the reference machine failures. In this example, the central data processing center 102 is configured to monitor work vehicles including a first work vehicle 104, a second work vehicle 106 and a third work vehicle 108. While the example system 100 includes three work vehicles that are depicted as a loader and a backhoe, in other examples, the system 100 may include any other number of work vehicles (e.g., 100 work vehicles; 1,000 work vehicles; 10,000 work vehicles, etc.) that are similarly and/or differently configured. For example, the system 100 may include work vehicles including graders, tractors, implements, front end loaders, combines, etc.

In the illustrated example, to enable the central data processing center 102 to predict the probability of one of the first, second and/or third work vehicles 104, 106 and 108 experiencing a machine failure, the central data processing center 102 includes a predictive model that is updated in real time based on data associated with work vehicles in communication with the system 100 including the first, second and third work vehicles 104, 106 and 108. In some examples, the data includes machine failures, alert sequences and probable parts lists of parts used to repair the respective machine failures that are linked, mapped and/or correlated within the predictive model by the central data processing center 102. In some examples, when linking and/or correlating the data, the central data processing center 102 uses identifiers including a machine pin, a suspect parameter number (SPN) and/or a failure mode indicator (FMI) to substantially ensure the accurate association of the data. The alert sequences included in the predictive model may satisfy a threshold of occurrences and/or may likely result in a machine failure (e.g., satisfy a support and confidence level).

To determine the probability of the first work vehicle 104 experiencing a machine failure, the central data processing center 102 is configured to be in communication with the first work vehicle 104. In the illustrated example, the first work vehicle 104 enables the central data processing center 102 to access first alert data 110 including one or more alert sequences. When determining the probability of the first work vehicle 104 experiencing a machine failure, in some examples, the central data processing center 102 compares the first alert data 110 to reference alert sequences associated with corresponding machine failures contained within the predictive model to determine if the first alert data contains an alert sequence associated with a machine failure. For example, the central data processing center 102 may compare a first alert sequence of the first alert data 110 to a first reference alert sequence of the predictive model stored in the reference database 103 to determine that the first alert sequence matches the first reference alert sequence and that the first work vehicle 104 has the possibility of experiencing an associated machine failure.

If the central data processing center 102 determines there is a match between one of the alert sequences contained within the first alert data 110 and one of the reference alert sequences associated with a reference machine failure, in the illustrated example, the central data processing center 102 uses the predictive model to determine a first machine failure probability estimate and probability parts prediction 112. As illustrated in FIG. 1, the central data processing center 102 provides access and conveys the first machine failure probability estimate and probable parts prediction 112 to the first work vehicle 104. In some examples, the first machine failure probability estimate and probable parts prediction 112 and/or an associated notification can be provided to any individual and/or entity (e.g., business, dealership, fleet manager, etc.) associated with the first work vehicle 104.

Similar to the first work vehicle 104, the second work vehicle 106 conveys and/or provides the central data processing center 102 access to the second alert data 114 and the third work vehicle 108 conveys and/or provides the central data processing center 102 access to the third alert data 116. The central data processing center 102 compares the second alert data 114 and/or the third alert data 116 to reference alert data (e.g., reference alert sequences) to identify a substantial match between an alert sequence of the second alert data 114, an alert sequence of the third alert data 116 and one of the reference alert sequences associated with the machine failure of the predictive model. As used herein, a substantial match between the alert sequence of the second alert data 114 and one of the reference alert sequences associated with the machine failure of the predictive model means that the alert sequence of the second alert data 114 includes at least 90% of the alerts within the reference alert sequence (e.g., nine out of ten alerts of the alert sequence of the second alert data 114 matches alerts of one of the reference alert sequences).

In response to identifying a match between one of the alert sequences of the second alert data 114 and one of the reference alert sequences associated with the machine failure of the predictive model and between one of the alert sequences of the third alert data 116 and one of the reference alert sequences stored in the reference database 103, in the illustrated example, the central data processing center 102 determines a second machine failure probability estimate and probable parts prediction 118 for the second work vehicle 106 and a third machine failure probability and probable parts prediction 120 for the third work vehicle 108. As shown in the example of FIG. 1, the second machine failure probability estimate and the probable parts prediction 118 is provided to the second work vehicle 106 and the third machine failure probability and probable parts prediction 120 is provided to the third work vehicle 108. However, access to the second machine failure probability estimate and probable parts prediction 118 and/or the third machine failure probability and probable parts prediction 120 may be provided to any user and/or any one associated with either of the second work vehicle 106 and/or the third work vehicle 108. For example, in some examples, one of the machine failure probability estimates and probable parts predictions 112, 118 and/or 120 may be provided to the fleet owner, a consumer, the owner of the vehicle, etc.

Figure 2:
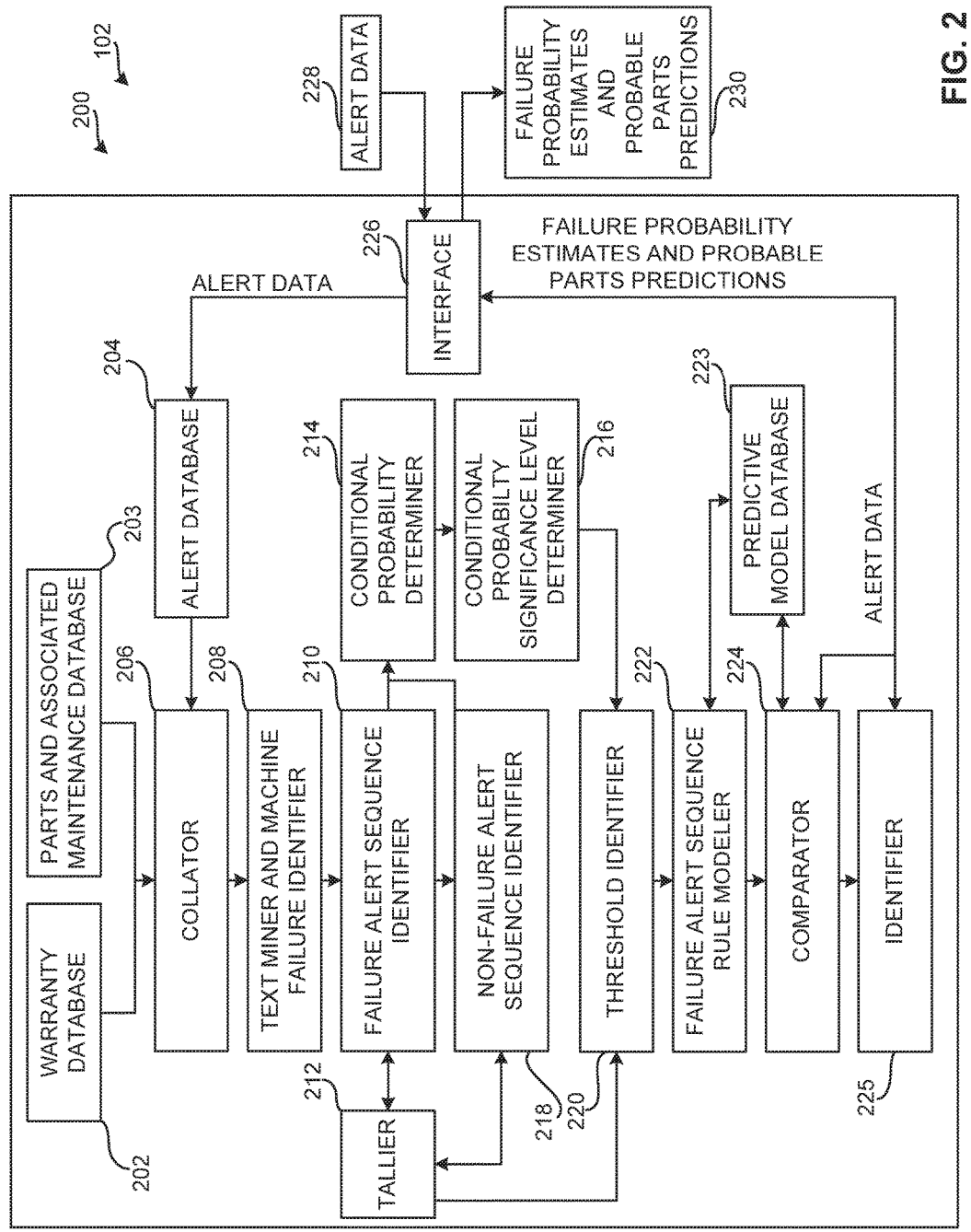
FIG. 2 illustrates an example apparatus that can be used to monitor work vehicles to predict and/or identify possible machine failures and identify parts used to repair such machine failures should one occur.

FIG. 2 illustrates an example apparatus 200 that can be implemented at the central data processing center 102 and/or the reference database 103 of FIG. 1 to generate and/or update a predictive model based on alert data received. The example apparatus 200 can also use and/or execute the predictive model to predict the probability of a work vehicle failing and the probable parts used to repair the work vehicle should such a machine failure occur. In this example, the apparatus 200 includes an example warranty database 202, an example parts and associated maintenance database 203, an example alert database 204, an example collator 206, an example text miner and machine failure identifier 208, an example failure alert sequence identifier 210, an example tallier 212, an example conditional probability determiner 214, an example conditional probability significance level determiner 216, an example non-failure alert sequence identifier 218, an example threshold identifier 220, an example failure alert sequence rule modeler 222, an example predictive model database 223, an example comparator 224, an example identifier 225 and an example interface 226.

In the illustrated example, the apparatus 200 receives and/or accesses alert data 228 and/or conveys and/or accesses failure probability estimates and probable parts predictions 230. The alert data 228 may include the first alert data 110, the second alert data 114 and the third alert data 116 and the failure probability estimates and probable parts predictions 230 may include the first machine failure probability estimate and probable parts prediction 112, the second machine failure probability estimate and probable parts prediction 118 and the third machine failure probability and probable parts prediction 120. In some examples, the warranty database 202, the parts and associated maintenance database 203 and the predictive model database 223 are implemented at the reference database 103 of FIG. 1.

In the illustrated example, to collate alert data, warranty data and parts and associated maintenance data, the collator 206 accesses the respective alert database 204, the warranty database 202 and the parts and associated maintenance database 203 and collates, links and/or associates the alert data, the warranty data and the parts and associated maintenance data to enable the data to be in a structured and/or queryable format (e.g., a model, a framework, a structured model, a structure framework, etc.). In some examples, the warranty database 202 includes maintenance logs and failure information associated with a work vehicle (e.g., an identifier of a work vehicle) and the parts and associated maintenance database 203 includes Technician Assistance Center (DTAC) data including part lists and/or technical documentation used when performing maintenance and/or repairs on the respective work vehicles. In some examples, the alert database 204 includes Machine Knowledge Center (MKC) data including machine alerts and/or telematics data and/or receives and/or is updated with the alert data 228 from one or more of the work vehicles in real time.

The warranty data, the parts and associated maintenance data and the alert data may be filtered to substantially ensure that the data collated by the collator 206 includes the expected fields and/or data. If the data received by the collator 206 is in dissimilar formats, the collator 206 may adjust and/or change the formatting such that the data within the model is consistently formatted, includes consistent naming conventions and/or enables the data to be more easily queried, mined, etc. In some examples, the collator 206 uses an identifier of the work machine (e.g., a personal identification number) from which the alert data, the machine maintenance and/or the parts data came to collate, link and/or associate the data from the different databases 202, 203, 204.

In some examples, the alert data may include different alerts such as, for example, a first severity alert (e.g., a green alert), a second severity alert (e.g., a yellow alert) and a third severity alert (e.g., a red alert). The first severity alert may be associated with the parameters of the work vehicle being in a normal operating range and/or within a threshold of the normal operating range (e.g., a normal range, a compliant range); the second severity alert may be associated with the parameters of the work vehicle being outside of the normal operating range and/or outside the threshold of the normal operating range (e.g., a transition range, a grey operating range); and a third severity alert may be associated with the parameters of the work vehicle being highly and/or significantly outside of the normal operating range and/or significantly outside the threshold of the normal operating range (e.g., an abnormal range, a non-compliant range).

To enable more information to be conveyed with and/or associated with each of the severity alerts (e.g., the generic color alerts), in some examples, two or more indicators may also be associated with each respective severity alert. In other words, additional tags and/or indicators may be associated with the respective ones of the generic color alerts. The indicators may include a Suspect Parameter Number (SPN) and a Failure Mode Indicator (FMI). The Suspect Parameter Number may identify the parameter to which the severity indicator is associated and the Failure Mode Indicator may provide a value indicating the severity and/or provide additional information regarding the severity of the parameter measurement and/or alert. In other words, in the described example, the severity alerts (e.g., red, yellow, green) provide a generic category and the indicators provide more detailed information regarding the parameter that the alert is associated with and the severity of that parameter measurement.

Figure 5:
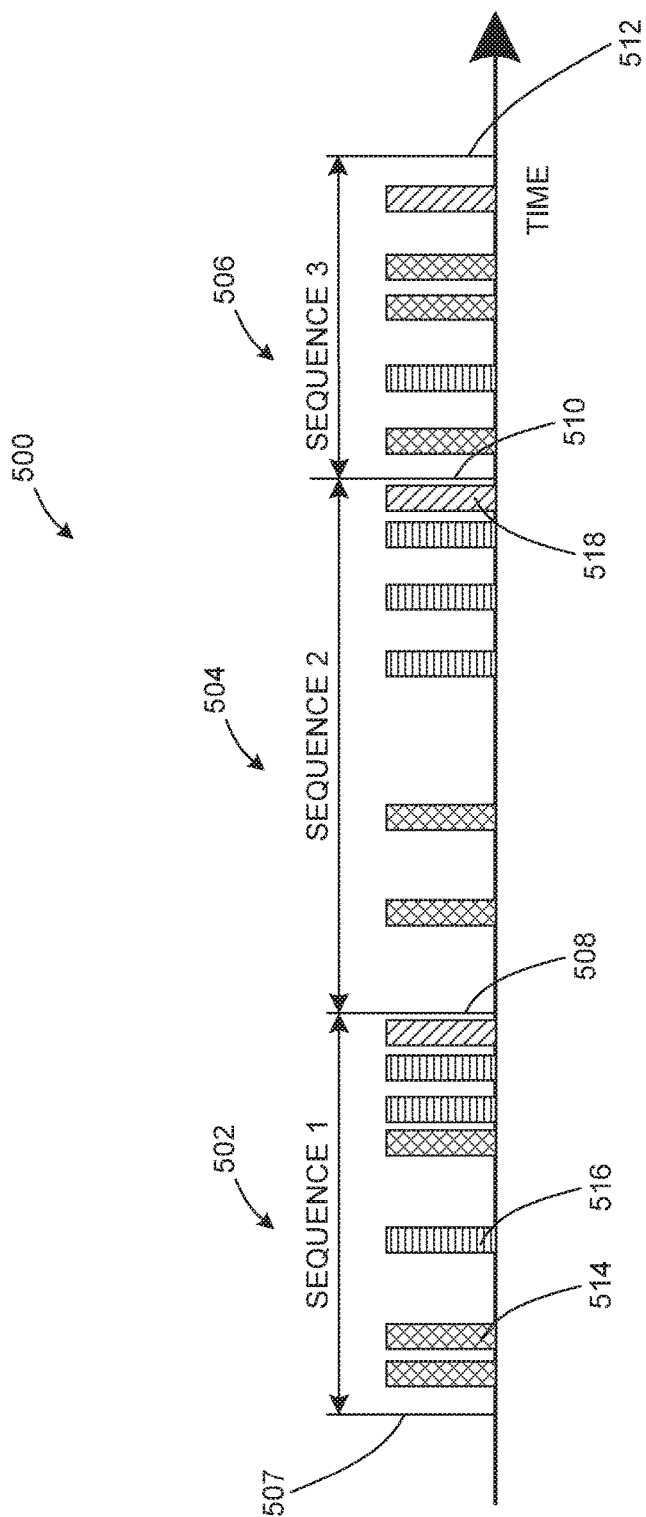
FIG. 5 illustrates example alerts obtained in connection with the teachings of this disclosure.

In the illustrated example, to identify machine failures (e.g., third severity alerts, red alerts) within the alert data, the text miner and machine failure identifier 208 accesses the alert data of the model generated and/or updated by the collator 206 and processes, mines, segments and/or parses the alert data to identify alert sequences within the alert data where each sequence may at least end with a third severity alert. In some examples, each of the sequences is bounded by a third severity alert. For example, with reference to FIG. 5, the text miner and machine failure identifier 208 may process alert data to identify a first sequence 502, a second sequence 504 and a third sequence 506 where the first sequence 502 is between a first machine failure and/or a first time 507 and a second machine failure and/or a second time 508; the second sequence 504 is between the second machine failure and/or the second time 508 and a third machine failure and/or a third 510; and the third sequence is between the third machine failure and/or the third time 510 and a fourth machine failure and/or a fourth time 512. As shown in the example of FIG. 5, the first, second and third sequences 502, 504, 506, include first severity alerts 514, second severity alerts 516 and third severity alerts 518 and each of the first, second and third sequences 502, 504, 506 end with a third severity alert 518 (e.g., GYGGR).

In the illustrated example, to identify the alerts within the first, second and third sequences, the failure alert sequence identifier 210 processes the first, second and third sequences to identify the alerts and/or the sequence of alerts within the first, second and/or third sequences. For example, the failure alert sequence identifier 210 may identify the first sequence as being GGYGYYR; the second sequence as being GGYYYR; and the third sequence as being GYGGR, where G represents a first severity alert, Y represents a second severity alert and R represents a third severity alert. While this example mentions the severity alerts and does not mention other indicators such as the SPI or the FMI, in other examples, the alert data includes the severity alerts, the SMI data and the FMI data.

In the illustrated example, as the apparatus 200 processes the alert data obtained from the different work vehicles and the failure alert sequence identifier 210 identifies alert sequences ending in failure, the tallier 212 tallies the number of sequences having the same alerts and/or patterns of alerts that end in a machine failure (e.g., identifies the occurrences of GYGR; GYGGR, etc.). In some examples, the threshold identifier 220 compares the number tallied by the tallier 212 to a reference number to determine if a threshold is satisfied. In some examples, the threshold is satisfied when five work vehicles have experienced the same alert sequence and/or the same pattern of alerts ending in failure. Referring to FIG. 6, the tallier 212 may generate and/or update a table 600 stored at the predictive model database 223 that identifies alert sequences and data associated with the alert sequences. In some examples, the table 600 includes a first column 602 that identifies the number of times a particular alert sequence occurred, a second column 604 that identifies the alert sequence and a third column 606 that identifies the length of the corresponding alert sequence in the second column 604.

In the illustrated example, to determine the conditional probability of the alert pattern of the first sequence, the second sequence and the third sequence leading to machine failure, the non-failure alert sequence identifier 218 arranges the alert sequences (e.g., alert sequences with the same pattern but both end and do not end in failure) based on length in ascending order to enable alert sequences not ending in failure to be identified. For example, the failure alert sequence identifier 210 may identify six of the third sequences (e.g., a five alert sequence; GYGGR) ending in failure and the non-failure alert sequence identifier 218 may identify two of the third sequences not ending in failure (e.g., GYGGY; GYGGG). In some examples, the non-failure alert sequence identifier 218 updates the third column 606 of FIG. 6 based on determining the length of the sequences.

In some examples, the tallier 212 tallies the number of occurrences in which the third alert sequence does not end in failure and also tallies the number of occurrences in which the third sequence ends in a failure. In some examples, the conditional probability determiner 214 determines the conditional probability of an alert sequence leading to failure based on the alert sequences ending in failure and not ending in failure identified by the failure alert sequence identifier 210 and the non-failure alert sequence identifier 218.

In the illustrated example, to determine the significance level of the conditional probability of each alert length sequence ending or not ending in failure (e.g., GYGGY; GYGGG; GYGGR; GYGGR) relative to all other alert sequences of the same length (e.g., YYGGY; YGGGG; YYYGR; YYGYR, etc.), the conditional probability significance level determiner 216 averages the conditional probabilities of alert sequences having the same length to determine a confidence value (e.g., a required confidence level (RCL)) and the threshold identifier 220 compares the confidence value to the conditional probability corresponding to an alert sequence to determine if the conditional probability of a particular alert sequence is greater than the associated confidence value. In some examples, when the conditional probability is greater than the confidence value, the threshold identifier 220 deems the alert sequence as an alert sequence that is likely to occur (e.g., the alert sequence is deemed significant). In other words, the conditional probability significance level determiner 216 determines the likelihood of an alert sequence occurring where the alert sequence includes those sequences ending in failure and those sequences not ending in failure, for example.

In the illustrated example, to generate and/or update the predictive model, the failure alert sequence rule modeler 222 generates and/or updates the predictive model with the alert sequences satisfying the threshold number of occurrences and/or satisfying the threshold conditional probability by collating, linking and/or associating the machine failure, the alert sequence, the conditional probability of machine failure occurring and the parts used when repairing the machine failure. In other words, the failure alert sequence rule modeler 222 associates alert sequences related to a machine failure, the probability of the machine failure occurring should the alert sequence preceding the machine failure be present and a list of probable parts used to repair a work vehicle should the machine failure occur.

In operation, based on the alert data 228 received at the interface 226, the comparator 224 compares the alert data 228 to reference alert sequences within the predictive model to determine if an alert sequence within the alert data 228 in the same and/or substantially similar to a reference alert sequence associated with a machine failure. In the illustrated example, if the comparator 224 identifies a substantial match between the alert sequence of the alert data 228 and the reference alert sequence of the predictive model, the identifier 225 identifies, based on the model, the associated probability of the machine failure occurring and the associated probable parts prediction used to repair the work vehicle should the failure occur. In some examples, the identifier 225 generates a table such as a table 700 of FIG. 7 that is stored in the predictive model database 223. Referring to FIG. 7, in this example, the table 700 includes a first column 702 including rows that identify different work machines, a second column 704 including the corresponding failure probability of the respective work machines based on the analysis of the alert data and a third column 706 including rows identifying parts to be used to repair the work machine.

While an example manner of implementing the central data processing center 102 of FIG. 1 is illustrated in FIG. 1, one or more of the elements, processes and/or devices illustrated in FIG. 2 may be combined, divided, re-arranged, omitted, eliminated and/or implemented in any other way. Further, the example warranty database 202, the example parts and associated maintenance database 203, the example alert database 204, the example collator 206, the example text miner and machine failure identifier 208, the example failure alert sequence identifier 210, the example tallier 212, the example conditional probability determiner 214, the example conditional probability significance level determiner 216, the example non-failure alert sequence identifier 218, the example threshold identifier 220, the example failure alert sequence rule modeler 222, the example predictive model database 223, the example comparator 224, the example identifier 225 and the example interface 226 and/or, more generally, the example central data processing center 102 of FIG. 1 may be implemented by hardware, software, firmware and/or any combination of hardware, software and/or firmware. Thus, for example, any of the example warranty database 202, the example parts and associated maintenance database 203, the example alert database 204, the example collator 206, the example text miner and machine failure identifier 208, the example failure alert sequence identifier 210, the example tallier 212, the example conditional probability determiner 214, the example conditional probability significance level determiner 216, the example non-failure alert sequence identifier 218, the example threshold identifier 220, the example failure alert sequence rule modeler 222, the example predictive model database 223, the example comparator 224, the example identifier 225 and the example interface 226 and/or, more generally, the example central data processing center 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example warranty database 202, the example parts and associated maintenance database 203, the example alert database 204, the example collator 206, the example text miner and machine failure identifier 208, the example failure alert sequence identifier 210, the example tallier 212, the example conditional probability determiner 214, the example conditional probability significance level determiner 216, the example non-failure alert sequence identifier 218, the example threshold identifier 220, the example failure alert sequence rule modeler 222, the example predictive model database 223, the example comparator 224, the example identifier 225 and the example interface 226 is/are hereby expressly defined to include a tangible computer readable storage device or storage disk such as a memory, a digital versatile disk (DVD), a compact disk (CD), a Blu-ray disk, etc. storing the software and/or firmware. Further still, the example central data processing center 102 of FIG. 1 may include one or more elements, processes and/or devices in addition to, or instead of, those illustrated in FIG. 2, and/or may include more than one of any or all of the illustrated elements, processes and devices.

Figure 3:
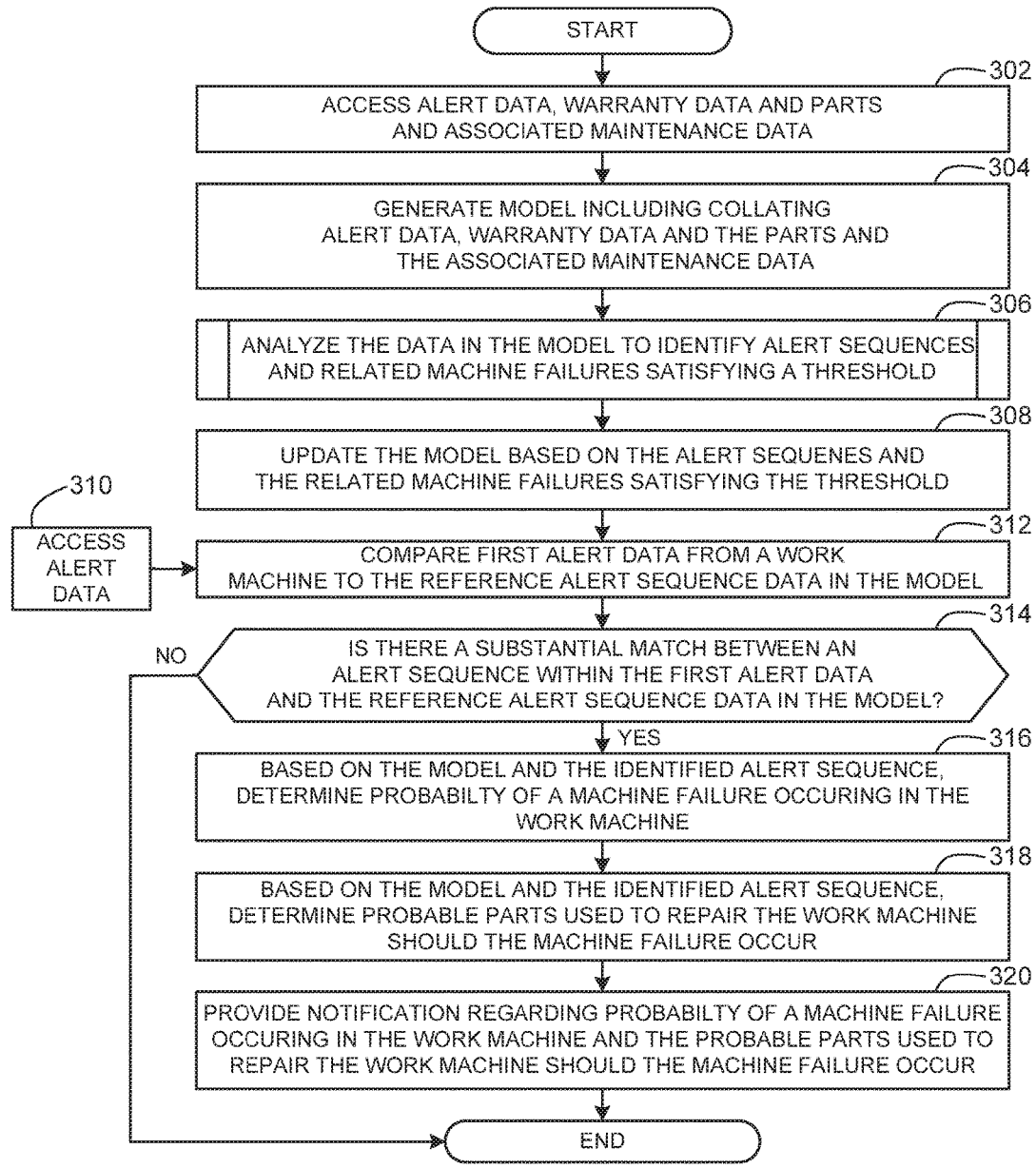
FIGS. 3 and 4 are flowcharts representative of machine readable instructions to implement the central data processing center of FIG. 1 and the example apparatus of FIG. 2 to predict and/or identify possible machine failures and identify parts used to repair such machine failures should one occur.
Figure 4:
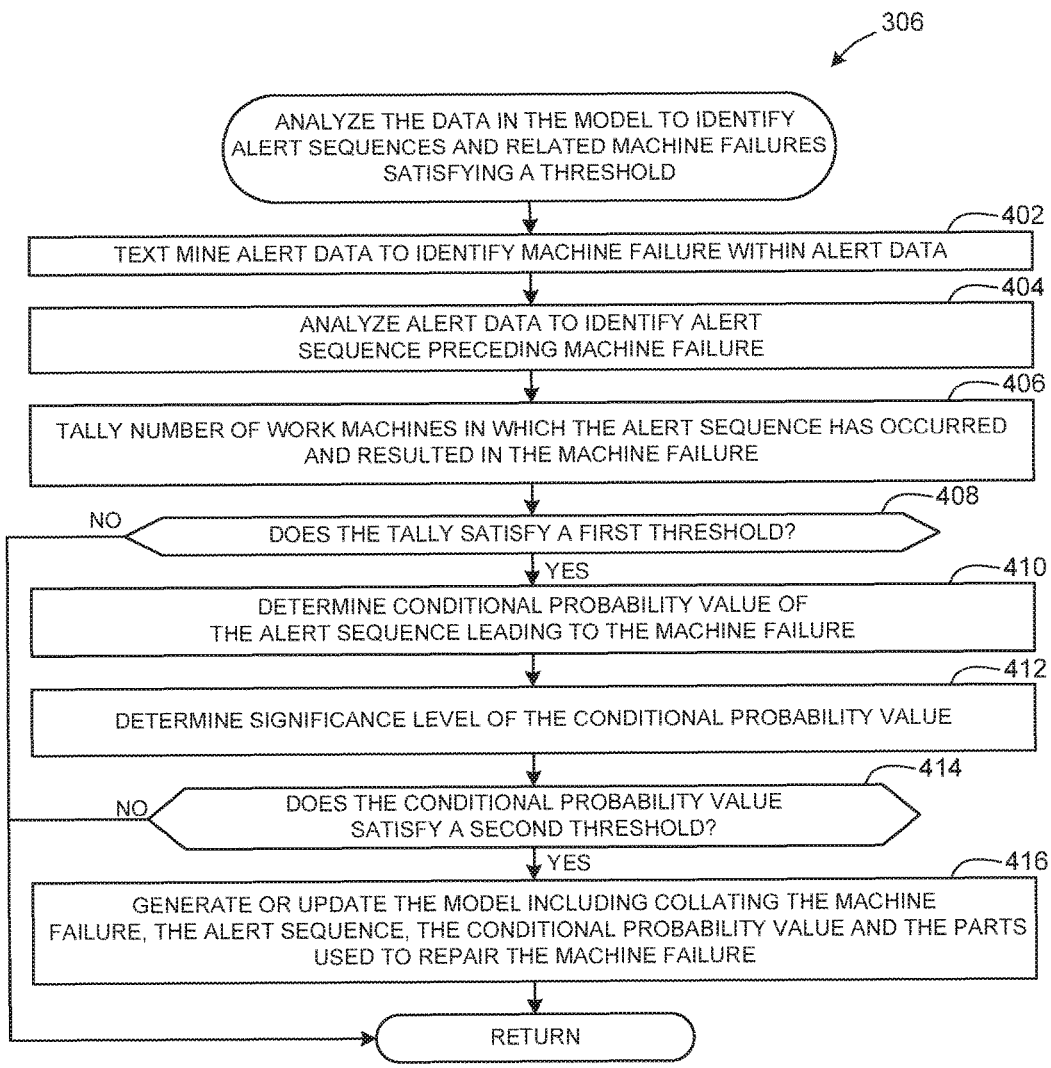

A flowchart representative of example machine readable instructions for implementing the central data processing center 102 of FIG. 1 is shown in FIGS. 3 and 4. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware.

Further, although the example program is described with reference to the flowchart illustrated in FIGS. 3 and 4, many other methods of implementing the example central data processing center 102 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 3 begins by accessing alert data, warranty data and parts and associated maintenance data (block 302) by, for example, the collator 206 accessing the warranty database 202, the parts and associated maintenance database 203 and the alert database 204. The process generates or updates a model including collating the alert data, the warranty data and the parts and associated maintenance data (block 304) by, for example, the collator 206 collating, linking and/or associating the data from the respective databases 202, 203, 204 into a structured and/or queryable format. The data in the model is analyzed to identify alert sequences and related machine failures satisfying a threshold (block 306) by, for example, the example text miner and machine failure identifier 208, the example failure alert sequence identifier 210, the example tallier 212, the example conditional probability determiner 214, the example conditional probability significance level determiner 216, the example non-failure alert sequence identifier 218 and the example threshold identifier 220 processing the data, as discussed in more detail in connection with FIG. 4 and illustrated in FIGS. 5-7, to identify the alert sequences and related machine failures that satisfy one or more thresholds. For example, the example failure alert sequence identifier 210 can identify alert sequences ending in a machine failure as illustrated in FIG. 5 and the example tallier 212 can tally the number of occurrences of a machine failure occurring and ending in failure as illustrated in FIG. 6.

The model is updated based on the alert sequences and the related machine failures satisfying the threshold (block 308) by, for example, the failure alert sequence rule modeler 222 generating and/or updating the predictive model stored in the predictive model database 223 with the alert sequences satisfying the threshold(s) by collating, linking and/or associating the machine failure(s), the alert sequence(s), the probability of the machine failure(s) occurring and the part(s) list(s) of the parts used for repairing the machine failure. For example, if the alert sequence "GGYR" is identified as resulting in a machine failure five times, the failure alert sequence rule modeler 222 may update the predictive model stored at the predictive model database 223 to include the alert sequence "GGYR," the associated machine failure (e.g., a hydraulic pump failure) and the associated parts to repair the machine failure. In some examples, alert sequences not ending in failure are used to change the conditional probability of a machine failure occurring and/or change the significance level of an alert sequence. In other words, alert sequences not satisfying a threshold may be used to update the predictive model.

The process accesses alert data (block 310) by, for example, the interface 226 receiving the alert data 228, the first alert data 110, the second alert data 114 and/or the third alert data 116. The first alert data from the work machine is compared to reference alert sequence data in the model (block 312) by for example, the comparator 224 comparing the alert data 228 to reference alert sequences within the predictive model. A determination is made whether there is a substantial match between the alert sequence within the first alert data and the reference alert sequence data in the model (block 314) by, for example, the comparator 224 identifying that an alert sequence of the first alert data (e.g., GGYR) is the same as the reference alert sequence data (e.g., GGYR) in the model. For example, the comparator 224 may compare the alert sequence with a plurality of reference alert sequences stored in the predictive model database 223 to identify if one of the reference alert sequences is the same as one the alert sequence from the work machine.

If there is a substantial match between the alert sequence within the first alert data and the reference alert sequence data in the model, the probability of the machine failure occurring in the work machine is determined based on the model and the identified alert sequence (block 316) by, for example, the identifier 225 identifying the machine failure and alert sequence mapped and/or linked with the corresponding probability. The probable parts used to repair the work machine should the machine failure occur is determined based on the model and the identified alert sequence (block 318) by, for example, the identifier 225 identifying the probable parts list that is mapped and/or linked with the associated machine failure and alert sequence. Notification is provided regarding the probability of the machine failure occurring in the work machine and the probable parts used to repair the work machine should the machine failure occur (block 320) by, for example, the interface 226 providing the failure probability estimates and probable parts prediction 232 to the corresponding work machine and/or another related entity as illustrated in the example table of FIG. 7.

FIG. 4 illustrates an example of implementing block 306 of FIG. 3. The program of FIG. 4 begins by text mining the alert data to identify a first machine failure within the alert data (block 402) by, for example, the text miner and machine failure identifier 208 accessing the alert data of the predictive model generated and/or updated by the collator 206 and processing, mining, segmenting and/or parsing the alert data to identify sequences and/or machine failures within the alert data. For example, the text miner and machine failure identifier 208 may process alert data to identify a first sequence between a first machine failure and a second machine failure; a second sequence between the second machine failure and a third machine failure; and a third sequence between the third machine failure and a fourth machine failure.

The alert data is analyzed to identify the first alert sequence preceding the first machine failure (block 404) by, for example, the failure alert sequence identifier 210 processing the identified sequences to identify the alerts and/or the sequence of alerts within the respective sequences. The number of work machines in which the first alert sequence has occurred and resulted in the first machine failure is tallied (block 406) by, for example, the tallier 212 tallying the number of sequences having the same alerts and/or patterns of alerts and ending in failure.

The process determines whether the tally satisfies a first threshold (block 408) by, for example, the threshold identifier 220 comparing the number tallied by the tallier 212 to a reference number to determine if the threshold is satisfied. If the tally satisfies the first threshold, the first conditional probability value of the first alert sequence leading to the first machine failure is determined (block 410) by, for example, the conditional probability determiner 214 determining the conditional probability of an alert sequence leading to failure based on the alert sequences ending in failure and the alert sequences not ending in failure identified by the failure alert sequence identifier 210 and the non-failure alert sequence identifier 218. The significance level of the first conditional probability value is determined (block 412) by, for example, the conditional probability significance level determiner 216 averaging the conditional probabilities of the alert sequences having the same length to determine the significance level.

The process determines whether the conditional probability value satisfies a second threshold (block 414) by, for example, the threshold identifier 220 comparing the significance level (e.g., a confidence value) to the conditional probability to determine if the conditional probability of the first alert sequence is greater than the corresponding significance level. In some examples, the first conditional probability value satisfies the second threshold when the first conditional probability value is greater than the significance level value.

The process generates or updates the model including collating and/or mapping the first machine failure, the first alert sequence, the first conditional probability value and the parts used to repair the first machine failure (block 416) by, for example, the collator 206 collating, linking, mapping and associating the machine failures, the corresponding alert sequence(s), the corresponding conditional probability value(s) and the corresponding part(s) used to repair the respective machine failure(s).

As mentioned above in connection with FIG. 2, FIG. 5 is a schematic illustration of example alerts 500 obtained in connection with the teachings of this disclosure where the alerts 500 are segmented by, for example, the text miner and machine failure identifier 208 into the first sequence 502 including first alerts (e.g., green alerts 514, yellow alerts 516 and red alerts 518), the second sequence 504 including second alerts (e.g., green alerts 514, yellow alerts 516 and red alerts 518) and the third sequence 506 including third alerts (e.g., green alerts 514, yellow alerts 516 and red alerts 518). In this example, the first sequence 502 is bounded by the first machine failure 507 and the second machine failure 508, the second sequence 504 is bounded by the second machine failure 508 and the third machine failure 510 and the third sequence 506 is bounded by the third machine failure 510 and the fourth machine failure 512.

FIG. 6 illustrates the example table 600 generated in connection with the teaching of this disclosure (e.g., output by the interface 226) where the table 600 includes the first column 602, the second column 604 and the third column 606. In this example, the first column 602 corresponds to the support and identifies the number of occurrences of, for example, a particular alert sequence leading to a machine failure. In this example, the second column 604 includes different alert sequences mined and/or parsed from the alert data and the third column 606 identifies the length of the corresponding alert sequence in the second column 604.

FIG. 7 illustrates the example table 700 generated in connection with the teaching of this disclosure (e.g., output by the interface 226) where the table 700 includes the first column 702, the second column 704 and the third column 706. In this example, the first column 702 corresponds to the name of the work machine and/or the personal identification number of the work machine; the second column 704 identifies the probability of the work machine identified in the first column 702 failing; and third column 706 identifies the probable parts used to repair the machine should the identified machine failure occur.

Figure 8:
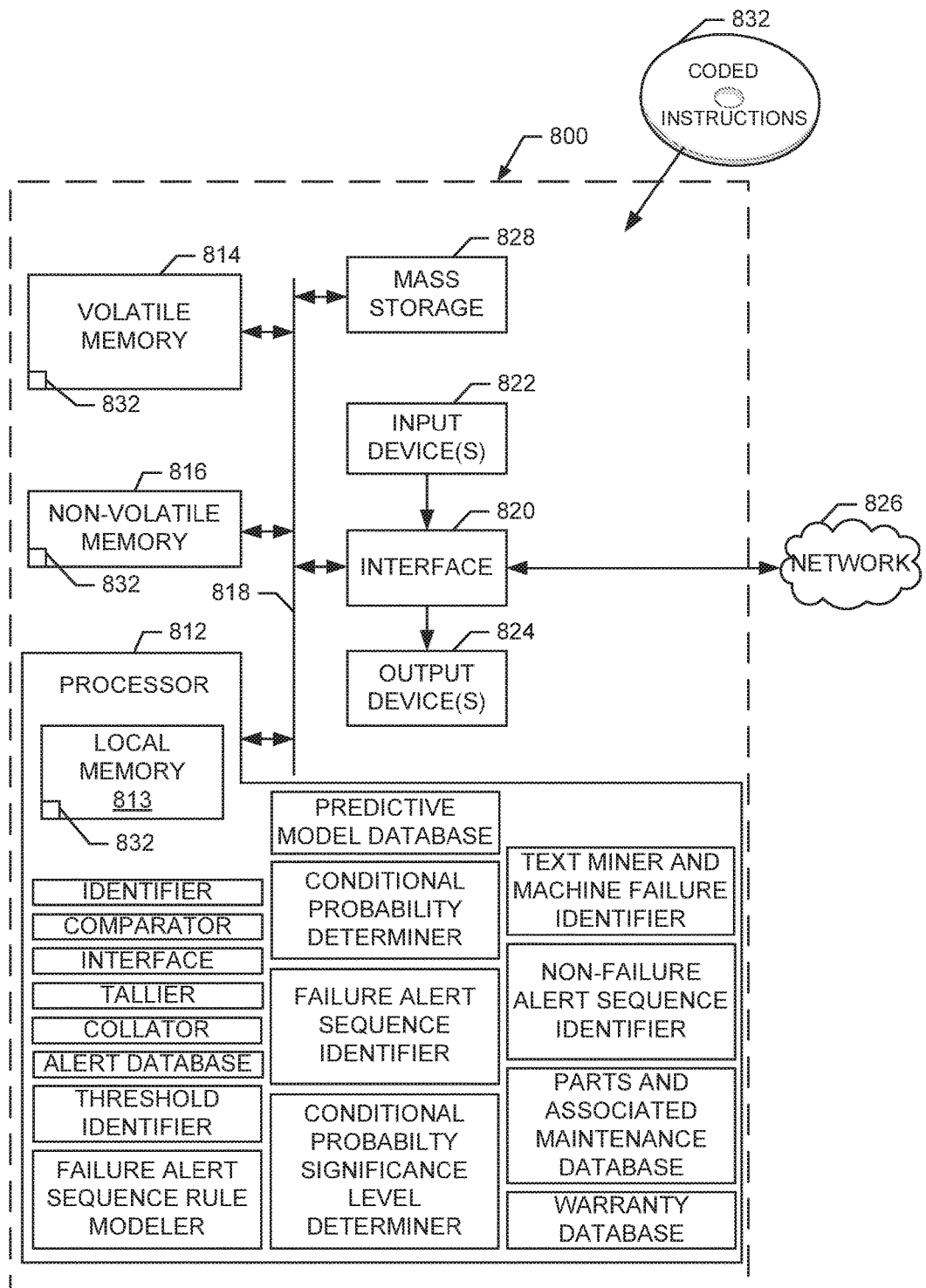
FIG. 8 is an example processor platform to execute the instructions of FIGS. 3 and 4 to implement the central data processing center of FIG. 1 and the example apparatus of FIG. 2.

FIG. 8 is a block diagram of an example processor platform 800 capable of executing the instructions of FIGS. 3 and 4 to implement the central data processing center 102 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device (s) 822 permit(s) a user to enter data and commands into the processor 812. The input device(s) can be implemented by, for example, an audio sensor, a microphone, a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 3 and 4 may be stored in the mass storage device 828, in the volatile memory 814, in the non-volatile memory 816, and/or on a removable tangible computer readable storage medium such as a CD or DVD.

From the foregoing, it will be appreciated that the above disclosed examples relate to updating and/or generating a framework and/or model including machine alerts and machine alert sequences relating to one or more machine failures and determining the number of occurrences of a particular machine failure. In some examples, as the additional information and/or data is integrated into the framework and/or the model, the framework and/or the model is dynamically updated in real-time and/or substantially real time based on the conditional probability of a select machine failure occurring in association with an alert sequence along with the probable parts used to repair the work machine should the machine failure occur. As used herein, substantially real time accounts for transmission delays.

The examples disclosed herein enable machine problems and/or failures to be identified in a timely manner to reduce downtime; reduce warranty costs by increasing preventative maintenance and/or repairing the work machine prior to a larger machine failure occurring; increase the ability to manage inventory of parts used to repair work machines based on the potential machine failures identified in a work machine and/or a fleet of work machines; increase the ability to schedule service personal and/or technicians to repair and/or perform maintenance on the work machine; reduce overall downtime experienced (e.g., scheduled downtime) by the work machine based on a potential machine failure being timely identified; enable machine maintenance to be scheduled; increase customer satisfaction and/or loyalty by decreasing machine failure downtime and/or occurrences.

The data relating to the parts used to repair work machines may be advantageously used to manage parts inventories to substantially ensure a part(s) is in stock that is used to repair the work machine when and/or if an anticipated failure occurs. The data relating to the parts used to repair the machines may be advantageously used to substantially ensure technician availability to repair the work machine when and/or if an anticipated failure occurs.

The examples disclosed herein dynamically monitor parameters and/or alert data of a work machine(s) and compare the parameters and/or alert data to reference data to determine a risk of the work machine(s) having a failure and/or break down. In some examples, the reference data correlates and/or maps a machine failure to a sequence of alerts (e.g., yellow alerts, green alerts, red alerts) and a part(s) used to repair the machine failure should one occur. In some examples, the reference data also associates a repair manual and/or instructions (e.g., technical documentation) with the associated machine failure. Thus, a technician tasked with repairing the work machine will have the parts and the instructions to repair the machine failure. In some examples, the reference data is composed of data (e.g., alert data, maintenance data, parts data) obtained from vehicles from different locations (e.g., different cities, different countries, different fleets, etc.).

In operation, first alert data from a first work machine is obtained and/or accessed and then compared to data in the model to determine if an alert sequence (e.g., an alert progression, an alert sequence buildup) contained within the first alert data matches and/or is substantially similar to a reference alert sequence within the data of the model. If an alert sequence within the first alert data matches and/or is substantially similar to a reference alert sequence, in some examples, the probability of the first work machine having a machine failure is determined and the parts used to repair the first work machine should the machine failure occur is determined.

An example method includes accessing a first alert sequence from a work vehicle; comparing the first alert sequence to a model, the model including an association between reference alert sequences, reference machine failures, and probable parts used to repair the respective machine failures; identifying a substantial similarity between the first alert sequence and a first reference alert sequence of the reference alert sequences; and based on the model and the first reference alert sequence, identifying first probable parts of the probable parts used to repair a first reference machine failure of the reference machine failures, where the first reference machine failure is associated with the first reference alert sequence.

In some examples, the method includes updating the model based on the first alert sequence. In some examples, the method includes, based on the model and the first alert sequence, determining a probability of the first reference machine failure occurring in the work vehicle. In some examples, the method includes generating a table including the association between the work vehicle, the probability of the first reference machine failure occurring in the work vehicle, and the first probable parts used to repair the first reference machine failure. In some examples, the work vehicle is a first work vehicle, and the method includes accessing second alert data from a second work vehicle and parsing the second alert data to identify a second alert sequence associated with the second work vehicle. In some examples, parsing the second alert data includes identifying a sequence of alerts including at least one failure alert.

In some examples, the method includes comparing the second alert sequence to the model; identifying a substantial similarity between the second alert sequence and a second reference alert sequence of the reference alert sequences; and based on the model and the second reference alert sequence, identifying second probable parts of the probable parts used to repair a second reference machine failure of the reference machine failures, where the second reference machine failure is associated with the second reference alert sequence. In some examples, the method includes updating the model by correlating a second machine failure and second probable parts used to repair the second machine failure; text mining second alert data to identify the second machine failure within the second alert data; identifying a second alert sequence associated with the second machine failure; and updating the model by correlating the second alert sequence with second machine failure and the second probable parts used to repair the second machine failure.

An example method includes generating a model including a correlation between a first machine failure and first probable parts used to repair the first machine failure; text mining first alert data to identify the first machine failure within the first alert data; identifying a first alert sequence associated with the first machine failure; and updating the model by correlating the first alert sequence with the first machine failure and the first probable parts used to repair the first machine failure.

In some examples, the method includes accessing second alert data from a second work vehicle and parsing the second alert data to identify a second alert sequence from the second work vehicle. In some examples, parsing the second alert data includes identifying a sequence of alerts including at least one failure alert. In some examples, the method includes comparing the second alert sequence to the first alert sequence; identifying a substantial similarity between the first and second alert sequences; and based on the model and the first alert sequence, identifying the first probable parts used to repair the first machine failure. In some examples, the method includes updating the model based on the identifying of the substantial similarity between the first and second alert sequences.

An example article of manufacture comprising instructions, which, when executed, cause a machine to at least: access a first alert sequence from a work vehicle; compare the first alert sequence to a model, the model including an association between reference alert sequences, reference machine failures, and probable parts used to repair the respective machine failures; identify a substantial similarity between the first alert sequence and a first reference alert sequence of the reference alert sequences; and based on the model and the first reference alert sequence, identify first probable parts of the probable parts used to repair a first reference machine failure of the reference machine failures, where the first reference machine failure is associated with the first reference alert sequence.

In some examples, the instructions, when executed, cause the machine to update the model based on the first alert sequence. In some examples, the instructions, when executed, cause the machine, based on the model and the first alert sequence, determine a probability of the first reference machine failure occurring in the work vehicle. In some examples, the instructions, when executed, cause the machine to generate a table including the association between the work vehicle, the probability of the first reference machine failure occurring in the work vehicle, and the first probable parts used to repair the first reference machine failure. In some examples, the instructions, when executed, cause the machine to access second alert data from a second work vehicle and parse the second alert data to identify a second alert sequence associated with the second work vehicle. In some examples, parsing the second alert data includes identifying a sequence of alerts including at least one failure alert. In some examples, the instructions, when executed, cause the machine to compare the second alert sequence to the model; identify a substantial similarity between the second alert sequence and a second reference alert sequence of the reference alert sequences; and based on the model and the second reference alert sequence, identify second probable parts of the probable parts used to repair a second reference machine failure of the reference machine failures, where the second reference machine failure is associated with the second reference alert sequence.

In some examples, an alert sequence as disclosed herein may include a combination or permutation of observed diagnostic code, observed vehicle sensor data, or observed vehicle status data, which may include the frequency, duration or order of the data as observed at the vehicle or equipment. Additionally and/or alternatively, the alert sequence data may be characterized by its duration (e.g., alert length) of observation of the data. Additionally and/or alternatively, the alert sequence can be an indicator that is associated with correlation data (or causal data) for certain faults and certain repair parts.

In some examples, the reference alert sequences as disclosed herein is a model alert sequence in the normal or acceptable, green range. In other examples, the reference alert sequences as disclosed herein is a model alert sequence in the negative or abnormal, red range. In some examples, identifying a match or a substantial similarity between the reference alert sequence and the observed alert sequence includes identifying the data, the sequence or order of the data, and the general duration of the sequence, with certain tolerances and/or thresholds.

In some examples, a model as disclosed herein combines an alert sequence with other information. In some examples, the model is a rule-based model that (1) includes historic warranty and repair records (e.g., DTAC data) from similar vehicles (e.g., same model number, type of equipment, or as-built components) and (2) includes matching between the observed alert sequence and the reference alert sequence. In some examples, the rule-based model uses statistical data to recommend predictive maintenance or parts where there is sufficient correlation greater than and/or satisfying a threshold between the identified matching alert sequence and corresponding correlated warranty and repair data from similar equipment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    parsing first alert data from a work vehicle to identify a first alert sequence, the first alert sequence including alert data between a first machine failure alert and a second machine failure alert;
    accessing the first alert sequence from the work vehicle, wherein the first alert sequence is associated with one or more of observed diagnostic code, observed vehicle sensor data, or observed vehicle status data;
    comparing the first alert sequence to a model including an association between reference alert sequences, reference machine failures, and probable parts used to repair the respective reference machine failures;
    identifying a substantial similarity between the first alert sequence and a first reference alert sequence of the reference alert sequences; and
    based on the model and the first reference alert sequence, identifying first probable parts of the probable parts used to repair a first reference machine failure of the reference machine failures, where the first reference machine failure is associated with the first reference alert sequence.

2. The method of claim 1, further including updating the model based on the first alert sequence, wherein the model is a rule-based model associated with historic warranty and repair data for work vehicles and reference alert sequences.

3. The method of claim 1, further including, based on the model and the first alert sequence, determining a probability of the first reference machine failure occurring in the work vehicle.

4. The method of claim 3, further including generating a table including the association between the work vehicle, the probability of the first reference machine failure occurring in the work vehicle, and the first probable parts used to repair the first reference machine failure.

5. The method of claim 1, wherein the work vehicle is a first work vehicle, further including accessing second alert data from a second work vehicle and parsing the second alert data to identify a second alert sequence associated with the second work vehicle.

6. The method of claim 5, wherein parsing the second alert data includes identifying a sequence of alerts including at least one failure alert.

7. The method of claim 5, further including comparing the second alert sequence to the model; identifying a substantial similarity between the second alert sequence and a second reference alert sequence of the reference alert sequences; and based on the model and the second reference alert sequence, identifying second probable parts of the probable parts used to repair a second reference machine failure of the reference machine failures, where the second reference machine failure is associated with the second reference alert sequence.

8. The method of claim 7, further including updating the model by correlating a second machine failure and second probable parts used to repair the second reference machine failure; text mining second alert data to identify the second machine failure within the second alert data; identifying a second alert sequence associated with the second machine failure; and updating the model by correlating the second alert sequence with second machine failure and the second probable parts used to repair the second reference machine failure.

9. A method, comprising:
    generating a model including a correlation between a first machine failure and first probable parts used to repair the first machine failure;
    text mining first alert data to identify the first machine failure within the first alert data;
    identifying a first alert sequence associated with the first machine failure; and
    updating the model by correlating the first alert sequence with the first machine failure and the first probable parts used to repair the first machine failure.

10. The method of claim 9, further including accessing second alert data from a second work vehicle and parsing the second alert data to identify a second alert sequence from the second work vehicle.

11. The method of claim 10, wherein parsing the second alert data includes identifying a sequence of alerts including at least one 1) an abnormal range alert associated with the color red; 2) a transition range alert associated with the color yellow; and 3) a normal range alert associated with the color green.

12. The method of claim 10, further including comparing the second alert sequence to the first alert sequence; identifying a substantial similarity between the first and second alert sequences; and based on the model and the first alert sequence, identifying the first probable parts used to repair the first machine failure.

13. The method of claim 12, further including updating the model based on the identifying of the substantial similarity between the first and second alert sequences.

14. An article of manufacture comprising instructions, which, when executed, cause a machine to at least:
parse first alert data from a work vehicle to identify a first alert sequence, the first alert sequence including alert data between a first machine failure alert and a second machine failure alert;
access the first alert sequence from the work vehicle;
compare the first alert sequence to a model, the model including an association between reference alert sequences, reference machine failures, and probable parts used to repair the respective reference machine failures;
identify a substantial similarity between the first alert sequence and a first reference alert sequence of the reference alert sequences; and
based on the model and the first reference alert sequence, identify first probable parts of the probable parts used to repair a first reference machine failure of the reference machine failures, where the first reference machine failure is associated with the first reference alert sequence.

15. The article of manufacture of claim 14, wherein the instructions, when executed, cause the machine to update the model based on the first alert sequence.

16. The article of manufacture of claim 14, wherein the instructions, when executed, cause the machine, based on the model and the first alert sequence, determine a probability of the first reference machine failure occurring in the work vehicle.

17. The article of manufacture of claim 16, wherein the instructions, when executed, cause the machine to generate a table including the association between the work vehicle, the probability of the first reference machine failure occurring in the work vehicle, and the first probable parts used to repair the first reference machine failure.

18. The article of manufacture of claim 14, wherein the instructions, when executed, cause the machine to access second alert data from a second work vehicle and parse the second alert data to identify a second alert sequence associated with the second work vehicle.

19. The article of manufacture of claim 18, wherein parsing the second alert data includes identifying a sequence of alerts including at least one failure alert.

20. The article of manufacture of claim 18, wherein the instructions, when executed, cause the machine to compare the second alert sequence to the model; identify a substantial similarity between the second alert sequence and a second reference alert sequence of the reference alert sequences; and based on the model and the second reference alert sequence, identify second probable parts of the probable parts used to repair a second reference machine failure of the reference machine failures, where the second reference machine failure is associated with the second reference alert sequence.

* * * * *